United States Patent [19]

Yoda

[11] Patent Number: 5,431,339
[45] Date of Patent: Jul. 11, 1995

[54] METHOD AND APPARATUS FOR CONTROLLING TEMPERATURE

[75] Inventor: Mitsuhito Yoda, Tokyo, Japan

[73] Assignee: Yamato Scientific Co., Ltd., Tokyo, Japan

[21] Appl. No.: 158,696

[22] Filed: Nov. 29, 1993

[30] Foreign Application Priority Data

Jun. 21, 1993 [JP] Japan .................................. 5-149010

[51] Int. Cl.⁶ ................................................ F23N 5/20
[52] U.S. Cl. ...................................... 236/46 R; 165/12
[58] Field of Search ........................ 236/46 R; 165/12

[56] References Cited

U.S. PATENT DOCUMENTS

| | | | |
|---|---|---|---|
| 3,311,303 | 3/1967 | Noyes | 236/46 R X |
| 3,922,535 | 11/1975 | Randolph | 236/46 R X |
| 4,409,662 | 10/1983 | Prabhakar | 364/557 |
| 5,038,852 | 8/1991 | Johnson et al. | 165/12 |

FOREIGN PATENT DOCUMENTS 0110408 6/1984 European Pat. Off. .
1589563 5/1981 United Kingdom .

Primary Examiner—William E. Wayner
Attorney, Agent, or Firm—Weiser & Associates

[57] ABSTRACT

A method of controlling temperature inside a chamber according to a temperature profile which includes a plurality of segments, each of which has an increasing or decreasing temperature period and a subsequent constant temperature period. An operator only needs to inputting a target temperature, a first period, and a second period, one time each, as parameters, for each sub-input-state which is part of an input-state and which is provided for each segment, so that the temperature is varied to match the target temperature for the first period and that the target temperature is maintained for the second period, for each segment.

4 Claims, 2 Drawing Sheets

| PARAMETER | SEGMENT ① | SEGMENT ② | SEGMENT ③ |
|---|---|---|---|
| RAMP TIME | 50 | STEP | 40 |
| RAMP LEVEL | 100 | 180 | 50 |
| SOAK TIME | 1:00 | 1:10 | HOLD |

| PARAMETER | SEGMENT ① | SEGMENT ② | SEGMENT ③ |
|---|---|---|---|
| RAMP TIME | 50 | STEP | 40 |
| RAMP LEVEL | 100 | 180 | 50 |
| SOAK TIME | 1:00 | 1:10 | HOLD |

| PARAMETER | STEP① | STEP② | STEP③ | STEP④ | STEP⑤ | STEP⑥ |
|---|---|---|---|---|---|---|
| START TEMP. | 25 | 100 | 100 | 180 | 180 | 50 |
| END TEMP. | 100 | 100 | 180 | 180 | 50 | 50 |
| TIME | 50 | 1:00 | STEP | 1:10 | 40 | HOLD |

METHOD AND APPARATUS FOR CONTROLLING TEMPERATURE

BACKGROUND OF THE INVENTION

The present invention relates generally to a method and apparatus for controlling temperature inside a chamber. It particularly relates to a method and apparatus for controlling temperature of air or liquid (e.g., water or oil) contained inside a chamber, such as a drying oven, or an incubator, or an electric furnace, etc., through temperature programing according to a temperature profile which has an increasing or decreasing temperature period and a subsequent constant temperature period.

In order to examine or test samples or substances, temperature controllers or regulators have been employed for regulating the temperature inside chambers in which the samples or substances are heated or cooled one or more times, according to temperature profiles required therefor in, for example, the Japanese Industrial Standard.

In order to set a temperature program according to the temperature profile in the above-mentioned temperature controller, the temperature controller deems that temperature changes in the chamber include an aggregate of steps each of which, respectively, has an increase or decrease temperature period toward a target temperature or a constant temperature period at the target temperature. An operator has to set the temperature program for each step while inputting a specific number of parameters for each step. For this initializing method, even though some parameters in different steps overlap, the operator always needs to set or input the specific numbers for the parameters for each step. Therefore, when setting a temperature program which includes many steps in the prior art, the operator needs to input many parameters repeatedly, thereby causing input errors or inconvenience in checking the parameters.

SUMMARY OF THE INVENTION

It is therefore an object of the present invention to improve the method and apparatus of the above-mentioned type in such a way that when initializing a temperature program for regulating temperature inside a chamber filled with air or liquid, the number of input parameters can be reduced to as few as possible.

The above object is achieved, according to the present invention, by a method of controlling temperature inside a chamber according to a temperature profile which includes a plurality of segments, each of which has an increasing or decreasing temperature period and a subsequent constant temperature period, comprising the steps of: (a) initializing an input-state with a plurality of sub-input-states each of which is provided for each said segment; (b) during the input state, according to the time passage of the segments, inputting a target temperature, a first period, and a second period as parameters, one time each, for each sub-input-state; and (c) according to the input parameters, varying the temperature to match the target temperature for the first period and maintaining the target temperature for the second period, for each segment.

In the above-described method for controlling temperature according to the present invention, it is deemed that a temperature profile with temperature changes includes a segment or segments each of which has an increasing or decreasing temperature period and a subsequent constant temperature period. That is, a segment according to the present invention corresponds to two steps in the prior art. Thus, when setting a temperature program according to a temperature profile, the operator only needs to input a target temperature, a first period, and a second period, each one time, as parameters for each sub-input-state according to the time passage of the segments, so that for each segment according to the input parameters, in the first period temperature is varied to match the target temperature and in the second period the target temperature is maintained. Therefore, when setting a temperature program, an operator does not need to input many parameters, some of which would also be repeated. For example, even though an operator needs to input three parameters for each step in the prior method, in the method or the apparatus according to the present invention, an operator only needs to input three parameters for each segment, which corresponds to three inputs for two steps, thereby reducing the number of parameters by half. Thus, the method or apparatus according to the present invention can facilitate setting a temperature program and can alleviate input errors or inconvenience in checking the parameters.

DETAILED DESCRIPTION OF THE PREFERRED EMBODIMENTS

Figure 1:
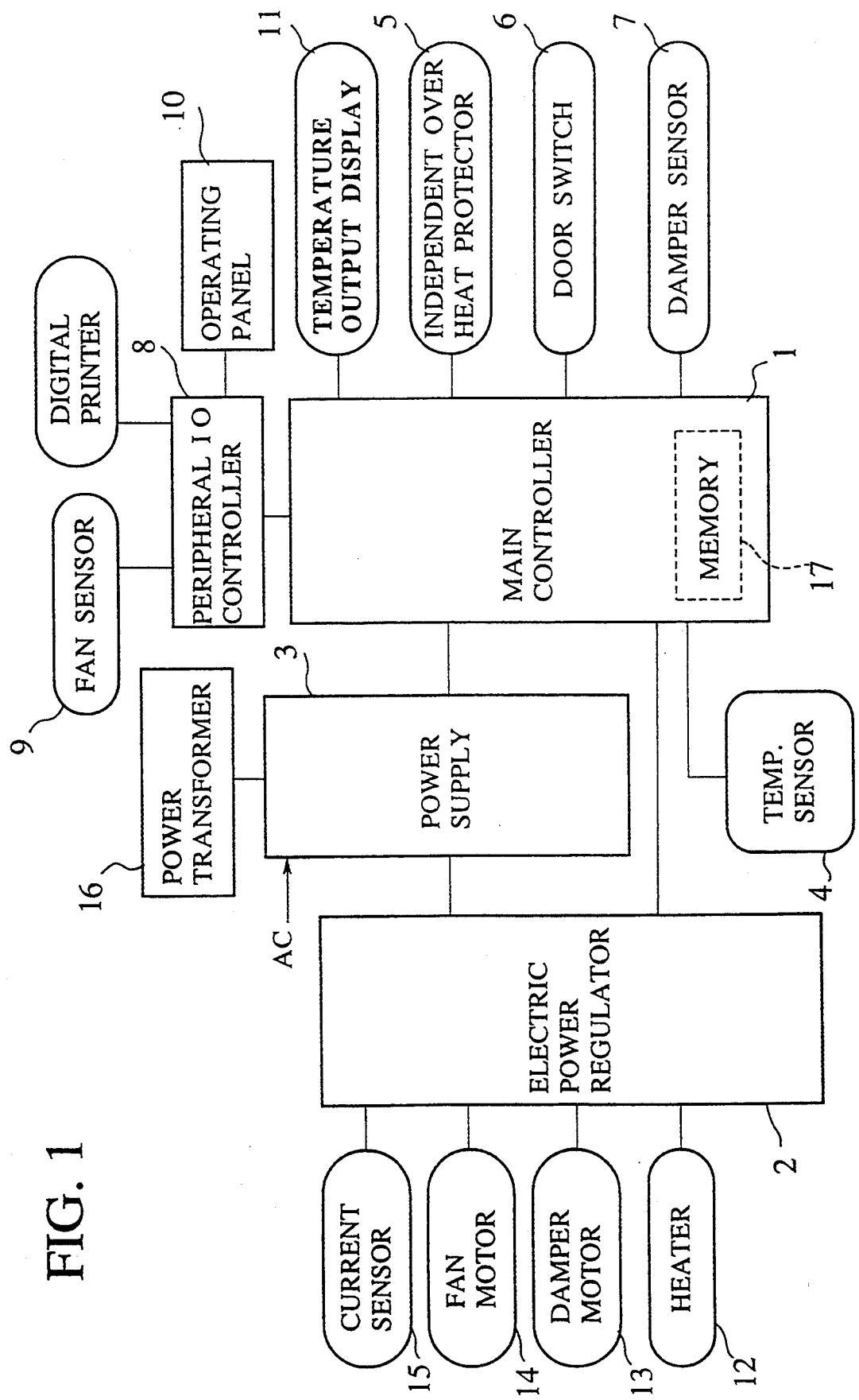
FIG. 1 is a schematic diagram in block form, showing the basic organization of a temperature controller according to the present invention.

FIG. 1 illustrates a schematic diagram in block form, showing the hardware layout of a temperature controller to which a method of controlling temperature according to the present invention is applied.

The temperature controller includes a main controller 1, an electric power regulator 2, and a power supply 3. The main controller 1 serves as a control center of the entire system. The power regulator 2 regulates electric power for each working part for regulating temperature inside a chamber, in which samples or substances are heated or cooled one time or more according to temperature profiles required therefor. The working parts will be described in detail later.

The main controller 1 includes a memory 17 for storing a temperature program with target temperatures, first periods, and second periods as parameters. Thus, the main controller 1 controls the electric power regulator 2, while supplying control signals thereto, according to the input parameters, to drive the working parts so as to execute the temperature program for varying the chamber temperature according to the time passage. A temperature sensor 4 for recognizing temperature inside the chamber, an independent over heat protector 5, a door switch 6, and a damper sensor 7 directly output signals to the main controller 1. A fan sensor 9 and an operating panel 10 indirectly output signals to the main controller 1 through a peripheral IO controller 8. The operating panel 10 is inputting parameters, which will be descibed later. The values taken by the temperature sensor 4 are represented on a temperature output display 11.

The working parts correspond to a current sensor 15, a fan motor 14, a damper motor 13, and a heater 12, which are driven by the electric power regulator 2 under the control of the main controller 1. When the current sensor 15 senses an unusual control condition for the working parts (e.g., from the heater 12), the electric power regulator 2, while receiving a signal from the current sensor 15, deals with the unusual control condition by, for example, shutting down driving all working parts, under the control of the main controller 1.

The power supply 3 receives power from the AC supplier and routes this power to a power transformer 18 which adjusts the power to a certain voltage level. The adjusted voltage is then fed back into the power supply 3 which rectifies it, and supplies it to the main controller 1.

The above-explained temperature controller controls temperature inside the chamber according to a temperature profile which includes a segment or segments each of which has an increasing or decreasing temperature period and a subsequent constant temperature period. In the temperature controller, when setting an input-state with a plurality of sub-input-states each of which is provided for. respectively, each segment, an operator can input a target temperature, a first period, and a second period, one time each, as parameters for each sub-input-state, according to the time passage of the segments. In this way, according to the input parameters, the temperature controller varies the present temperature to the target temperature for the first period and maintains the target temperature for the second period, for each segment. Namely, the first period corresponds to the period required to reach the target temperature, the second period corresponds to the period to maintain the target temperature. This operation will be concretely explained in detail below. In the explanation below, the target temperature will be referred to as a ramp level, the first period as a ramp time, and the second period as a soak time.

Figures 2A, 2B, 2C:
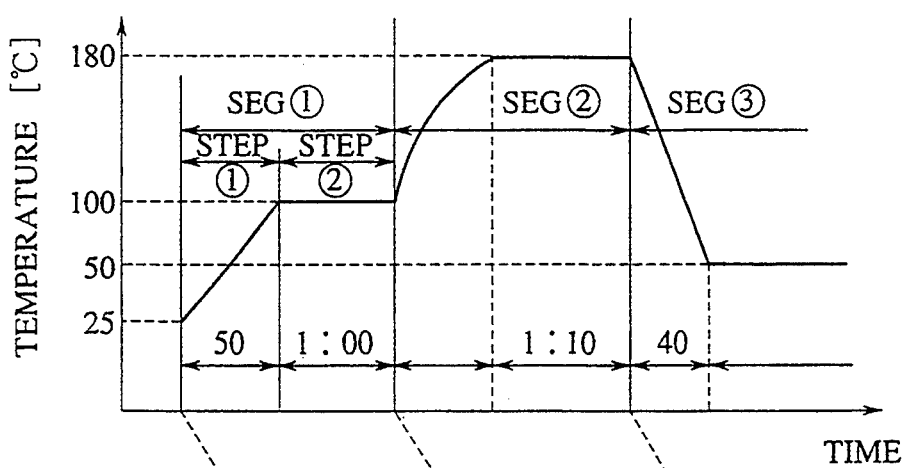
FIG. 2(a) is a line graph showing a temperature profile, i.e., a relationship between time and temperature in a chamber.
FIG. 2(b) is a table showing a program corresponding to the temperature profile shown in FIG. 2(a)
FIG. 2(c) is a table showing a program made according to the prior art.

As an example, temperature inside the chamber will be controlled following to temperature profile shown in FIG. 2(a), namely, according to the temperature program shown in FIG. 2(b).

First, an operator sets, on the operating panel 10, an input-state with a plurality of sub-input-states each of which is provided for each segment. Then, during the input state, according to the time passage of the segments, the operator inputs a ramp level, a ramp time, and a soak time as parameters, one time each, for each sub-input-state. Specifically, for SEGMENT ①, (i.e., the first segment) the operator inputs, each one time, 100, 50, and 1:00 for the ramp level, the ramp time, and the soak time, respectively. Likewise, the operator inputs, one time only, the values for SEGMENT ②, (i.e., the second segment) 180, STEP, and 1:10 and for SEGMENT ③, (i.e., the third segment) 50, 40, and HOLD, for the ramp level, the ramp time, and the soak time, respectively. These input parameters are stored in the memory 17 according to the time passage of the segments for each sub-input-state (i.e., for each segment). The ramp level, the ramp time, and the soak time exemplified above are respectively represented by Celsius, minute, and hour:minute.

Next, the main controller 1 outputs control signals to the electric power regulator 2 according to the input parameters stored in the memory 17 (i.e., according to the temperature program). The electric power regulator 2, under the control of the main controller 1, regulates the heater 12 and other working parts.

First, namely in SEGMENT ①, the heater 12 elevates the temperature inside the chamber toward 100° C. in 50 minutes using a constant increasing condition. Namely, when a number is input as a ramp time in the sub-input-state, the heater 12 linearly elevates temperature inside the chamber. While STEP is input as a ramp time in a sub-input-state, the heater 12 elevates the temperature toward the input ramp level as fast as possible by using the highest heating power. After reaching 100° C., the temperature inside the chamber is maintained for an hour as illustrated in FIG. 2(a).

After maintaining 100° C. for an hour, SEGMENT ② is entered and the temperature inside the chamber is then elevated by the heater 12 using as much power as possible. After reaching 180° C., the temperature is maintained for an hour and 10 minutes. Now, since SEGMENT ③ is activated, the temperature inside the chamber is cooled down for 40 minutes until reaching 50° C., followed by maintaining 50° C. continuously. Namely, for the soak time, if HOLD is input instead of inputting a certain number, the temperature inside the chamber is continuously maintained, or until the power switch of the temperature controller is turned off.

Now referring to FIG. 2(c), a conventional temperature program with steps which, respectively, have three parameters, a start temperature, an end temperature, and a time, is illustrated to be compared to the above-mentioned program according to the present invention. In the conventional program, since each step corresponds to an increasing or decreasing temperature period or a constant temperature period, two steps correspond to one segment of the present invention. Specifically, STEPS ① and ② correspond to SEGMENT ①. Therefore, it is necessary for the conventional program that double numbers of parameters be input.

Taking the above-explained conventional program into consideration, the temperature program according to the present invention only needs half the number of parameters to be input. Thus, it is necessary for the program of the present invention to only select and input parameters which represent relationships between time and temperature, without repeating the same parameters as was required by the previous method.

Therefore, when setting a temperature program, an operator does not need to input many parameters repeatedly, but only needs to input three parameters for each segment which corresponds to two steps of the prior method, thereby facilitating setting a temperature program and alleviating input errors or inconvenience in checking the parameters.

What is claimed is:

1. A method of controlling temperature inside a chamber according to a temperature profile which includes an increasing or decreasing temperature period and a subsequent temperature constant period, comprising the steps of:
    (a) initializing an input state;
    (b) during the input state, according to the temperature profile, inputting a target temperature, a first period, and a second period, one time each, as parameters; and (c) according to the input parameters, varying the temperature to match the target temperature for the first period and maintaining the target temperature for the second period.

2. A method of controlling temperature inside a chamber according to a temperature profile which includes a plurality of segments each of which has an increasing or decreasing temperature period and a subsequent constant temperature period, comprising the steps of:

(a) initializing an input-state with a plurality of sub-input-states each of which is provided for each said segment;

(b) during the input state, according to the time passage of the segments, inputting a target temperature, a first period, and a second period, one time each, as parameters, for each sub-input-state; and (c) according to the input parameters, varying the temperature to match the target temperature for the first period and maintaining the target temperature for the second period, for each segment.

3. A method of claim 2, wherein a STEP instruction for selecting the fastest elevation of the temperature is input instead of inputting a number as in the first period in said inputting step.

4. An apparatus for controlling temperature inside a chamber according to a temperature profile which includes a plurality of segments each of which has an increasing or decreasing temperature period and a subsequent constant temperature period, comprising:

means for initializing an input-state with a plurality of sub-input-states each of which is provided for each said segment;

means for inputting a target temperature, a first period, and a second period, one time each, as parameters;

means for storing the input parameters; and means for reading each input parameter one time for each sub-input-state; and means for varying the temperature to match the target temperature for the first period and maintaining the target temperature for the second period, for each segment, according to the input parameters.

* * * * *